(12) United States Patent
Sabo

(10) Patent No.: US 7,798,726 B2
(45) Date of Patent: Sep. 21, 2010

(54) ELECTRICAL CONNECTOR WITH IMPROVED SIGNAL TRANSMISSION MEANS

(75) Inventor: James M. Sabo, Harrisburg, PA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/229,448

(22) Filed: Aug. 22, 2008

(65) Prior Publication Data

US 2010/0046891 A1 Feb. 25, 2010

(51) Int. Cl.
*G02B 6/36* (2006.01)
*H01R 33/945* (2006.01)

(52) U.S. Cl. ............................ 385/88; 385/89; 385/53; 385/92; 385/93; 439/577

(58) Field of Classification Search .................. 385/14, 385/53, 88, 89, 92–94; 439/577, 607, 676, 439/638, 639, 692, 693, 541.5, 660, 680
See application file for complete search history.

(56) References Cited

U.S. PATENT DOCUMENTS

| | | | |
|---|---|---|---|
| 5,725,386 A | 3/1998 | Davis et al. | |
| 5,779,489 A | 7/1998 | Davis et al. | |
| 6,139,350 A | 10/2000 | Mathesius | |
| 6,238,244 B1 * | 5/2001 | Yang | 439/607 |
| 6,364,706 B1 | 4/2002 | Ando et al. | |
| 6,755,575 B2 * | 6/2004 | Kronlund et al. | 385/73 |
| 6,964,578 B2 * | 11/2005 | Clark et al. | 439/320 |
| 7,021,971 B2 | 4/2006 | Chou et al. | |
| 7,104,848 B1 | 9/2006 | Chou et al. | |
| 7,108,560 B1 | 9/2006 | Chou et al. | |
| 7,125,287 B1 | 10/2006 | Chou et al. | |
| 7,128,617 B2 * | 10/2006 | Wang et al. | 439/660 |
| 7,134,884 B2 | 11/2006 | Wang et al. | |
| 7,182,646 B1 * | 2/2007 | Chou et al. | 439/660 |
| 7,232,346 B2 | 6/2007 | Hu et al. | |
| 7,331,819 B2 * | 2/2008 | Nelson et al. | 439/577 |
| 2005/0063647 A1 * | 3/2005 | Thornton et al. | 385/89 |
| 2005/0118880 A1 * | 6/2005 | Reichle | 439/676 |

(Continued)

FOREIGN PATENT DOCUMENTS

JP  2001167828 A  *  6/2001

(Continued)

*Primary Examiner*—K. C. Kianni
*Assistant Examiner*—Robert Tavlykaev
(74) *Attorney, Agent, or Firm*—Wei Te Chung; Andrew C. Cheng; Ming Chieh Chang

(57) ABSTRACT

A connector (100) includes an insulative housing (1) having a base portion (11), a first tongue portion (12) extending forwardly from the base portion and a plurality of first passageways (123), the first tongue portion is thinner than the base portion and defines a front mating face (120), an upper side face (121) and a lower side face (122) opposite to the upper side face. A number of first electrical contacts (21) are received in the first passageways respectively, the first electrical contacts each defines a first contacting portion (210), a first soldering portion (212) and a first retaining portion (211) connecting with the first contacting portion and the first soldering portion. A number of optical components (4, 5) are mounted on the first tongue portion and exposed to exterior through the front mating face.

12 Claims, 19 Drawing Sheets

U.S. PATENT DOCUMENTS

| | | |
|---|---|---|
| 2006/0025015 A1* | 2/2006 | Hu et al. .................. 439/607 |
| 2006/0120671 A1* | 6/2006 | Graham et al. ............. 385/75 |
| 2006/0261474 A1 | 11/2006 | Jiang et al. |
| 2006/0263012 A1* | 11/2006 | Yamazaki .................. 385/88 |
| 2006/0286865 A1 | 12/2006 | Chou et al. |
| 2006/0294272 A1 | 12/2006 | Chou et al. |
| 2007/0049119 A1* | 3/2007 | Fujimoto et al. ........... 439/610 |
| 2007/0105452 A1* | 5/2007 | Gerlach et al. ............. 439/676 |
| 2007/0117459 A1 | 5/2007 | Chen |
| 2008/0218799 A1* | 9/2008 | Hiew et al. ................ 358/1.16 |

FOREIGN PATENT DOCUMENTS

| | | |
|---|---|---|
| JP | 2001167837 A * | 6/2001 |
| WO | WO 2008/121731 A1 * | 3/2008 |

\* cited by examiner

ELECTRICAL CONNECTOR WITH IMPROVED SIGNAL TRANSMISSION MEANS

BACKGROUND OF THE INVENTION

1. Field of the Invention

The present invention relates to electrical connectors, more particularly to electrical connectors with additional signal transmission means.

2. Description of Related Art

In information technology, Universal Serial Bus (USB) is a serial bus standard to interface devices. USB can connect computer peripherals such as computer mouse, keyboards, PDAs, gamepads and joysticks, scanners, digital cameras, printers, personal media players, and flash drives. For many of those devices, USB has become the standard connection method.

The design of USB is standardized by the USB Implementers Forum (USB-IF), an industry standards body incorporating leading companies from the computer and electronics industries. As of 2006, the USB specification was at version 2.0 (with revisions). The USB 2.0 specification was released in April 2000 and was standardized by the USB-IF at the end of 2001. The USB 2.0 specification is available from website: http://www.usb.org/home. Previous notable releases of the specification were 0.9, 1.0, and 1.1. Equipment conforming to any version of the standard will also work with devices designed to any previous specification (known as: backward compatibility).

The USB 2.0 specification defines several types of USB connectors such as Standard-A and Standard-B plugs and receptacles. Type-A plugs only mate with type-A receptacles, and type-B plugs only mate with type-B receptacles. FIG. 19 shows an existing USB 2.0 Standard-A plug 8, the Standard-A plug 8 includes an insulative plug tongue portion 80 formed of an insulating material, four conductive contacts 81 fixed on the insulative plug tongue portion 80. The four conductive contacts 81 are located orderly from left to right to transfer power, D−, D+ and ground signals, respectively, the two central conductive contacts constitute a pair of differential contacts used to transfer/receive data. However, the current USB 2.0 version has a top data-transfer rate of 480 megabits per second which does not efficiently meet requirement of data transmission speed for optical drives such as DVD, Blue-ray and HD DVD. Recently, some approaches have been made to add more electrical contacts as shown in the conending application Ser. No. 11/818,100, and others apply further optics to the connector.

BRIEF SUMMARY OF THE INVENTION

According one aspect of the present invention, a connector to be mounted on a printed circuit board, comprises: an insulative housing having a base portion, a first tongue portion extending forwardly from the base portion and a plurality of first passageways, the first tongue portion being thinner than the base portion and defining a front mating face, an upper side face and a lower side face opposite to the upper side face; a plurality of first electrical contacts received in the first passageways respectively, the first electrical contacts each defining a first contacting portion, a first soldering portion and a first retaining portion connecting with the first contacting portion and the first soldering portion; a plurality of optical components mounted on the first tongue portion and being exposed to exterior through the front mating face.

According to another aspect of the present invention, a connector comprises: an insulative housing having a base portion defining a front engaging face, a tongue portion extending forwardly from the front engaging face, the tongue portion being thinner than the base portion and defining a front mating face, an upper side face and a lower side face opposite to the upper side face; a metal shell mounted on the insulative housing and defining an upper wall, a pair of side walls and a lower wall, an upper receiving room being formed between the upper wall and the upper side face; a plurality of first electrical contacts each defining a first contacting portion being exposed to the upper receiving room, a first rear end portion and a first retaining portion connecting with the first contacting portion and the first rear end portion; a plurality of lenses positioned on the base portion, the lenses being exposed to the upper receiving room; a plurality of optical fibers mating with the lenses respectively and extending outside the base portion.

Other objects, advantages and novel features of the present invention will become more apparent from the following detailed description of the present embodiment when taken in conjunction with the accompanying drawings.

DETAILED DESCRIPTION OF THE PREFERRED EMBODIMENTS

Figure 1:
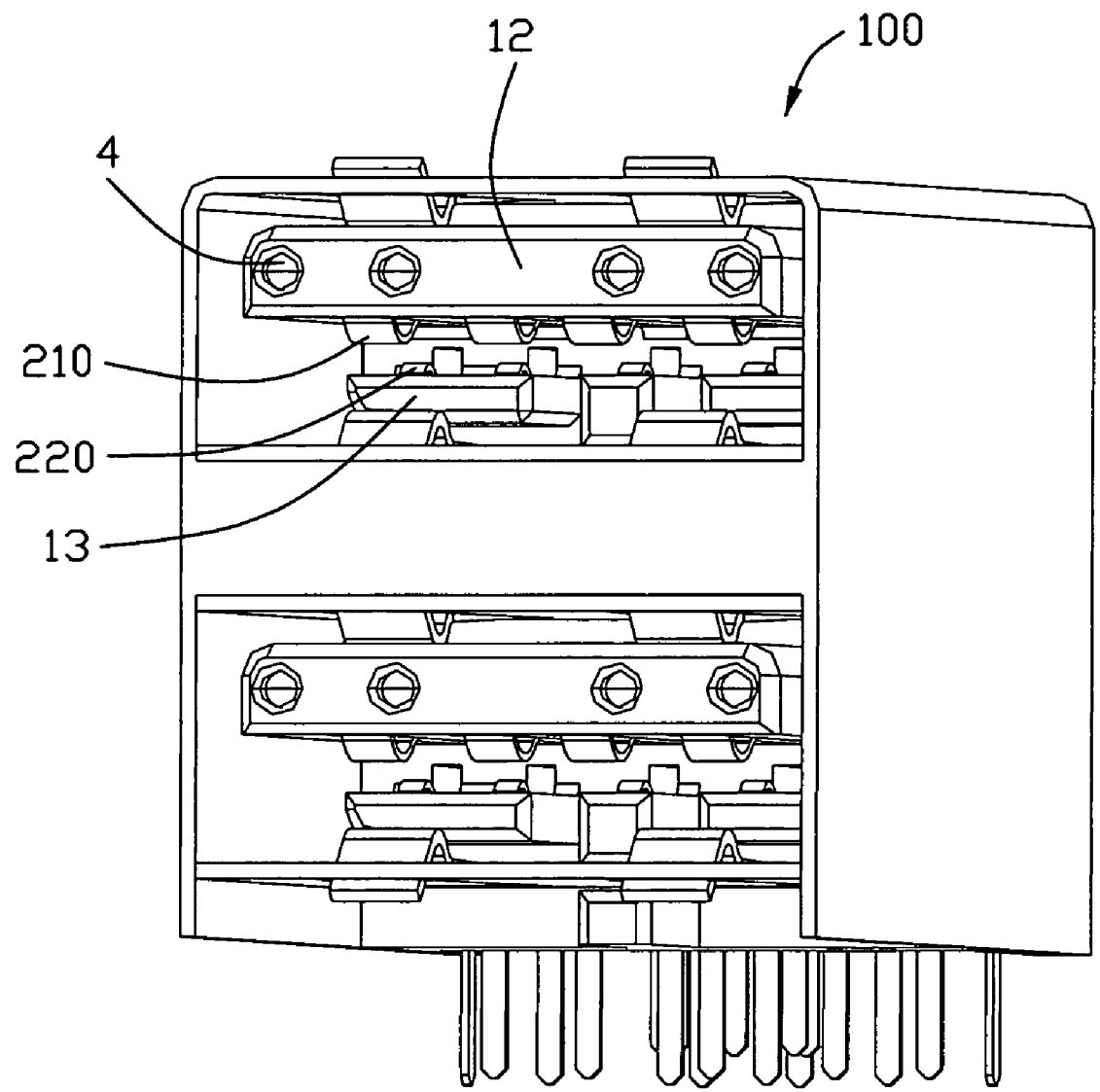
FIG. 1 is a perspective view of an electrical connector according to a first embodiment of the present invention.

Reference will be made to the drawing figures to describe the present invention in detail, wherein depicted elements are not necessarily shown to scale and wherein like or similar elements are designated by same or similar reference numeral through the several views and same or similar terminology.

Within the following description, a standard USB connector, receptacle, plug, and signaling all refer to the USB architecture described within the Universal Serial Bus Specification, 2.0 Final Draft Revision, which is hereby incorporated by reference herein. USB is a cable bus that supports data exchange between a host and a wide range of simultaneously accessible peripherals. The bus allows peripherals to be attached, configured, used, and detached while the host and other peripherals are in operation. This is referred to as hot plug.

Referring to FIGS. 1-12, an electrical connector 100 according to a first embodiment of the present invention is preferably a stacked receptacle mounted on a PCB (not shown) and is compatible to USB 2.0 protocol to transmit USB electrical signals. Optical fibers are incorporated to the electrical connector 100 to enable optical signal connections, therefore, the electrical connector 100 of the first embodiment is preferably a Multi-Media (copper and fiber-optics) Capable USB. The electrical connector 100 includes an upper interface 101 and a lower interface 102 which is substantially identical to the upper interface 101, both the upper interface 101 and the lower interface 102 are able to mate with a second plug 9 or a first plug which is an existing USB 2.0 standard type-A plug 8.

The second plug 9 is connected to copper cables and optical cables (not shown), and includes an insulative housing 90 having a base portion 91 defining a front engaging face 910, a tongue portion 92 extending forwardly from the base portion 91. The tongue portion 92 is thinner than the base portion 91 and defines a front mating face 920, an upper side face 921 and a lower side face 922 opposite to the upper side face 921. A metal shell 93 is mounted on the insulative housing 90 and defines an upper wall, a lower wall and a pair of side walls connecting with the upper wall and the lower wall, an upper receiving room 94 is formed between the upper wall and the upper side face 921. The shell 93 defines two pairs of first locking windows 931 and two pairs of second locking windows 932 located behind the first locking windows 931. The tongue portion 92 includes a front portion 923 and a rear portion 924 connecting with the base portion 91 and the front portion 923, the front portion 923 is thinner than the rear portion 924. A lower receiving room is formed between the lower wall and the front portion 923.

The second plug 9 includes a plurality of first electrical contacts 95 used to transmit existing USB 2.0 standard signals, and a plurality of second electrical contacts 96 for transmitting high-speed signals. The second contacts 96 include a first pair of differential contacts 960, a second pair of differential contacts 962 and a ground contact 961 located between the first pair of differential contacts 960 and the second pair of differential contacts 962 along a lateral direction of the tongue portion 92. The first contacts 95 include a power contact, a D− signal contact, a D+ contact and a ground contact which are arranged orderly from left to right along a lateral direction of the tongue portion 92. In an alternative embodiment, the contacts 960, 962 may be configured in non-differential manner.

The first electrical contacts 95 are received in first passageways 928 formed on the upper side face 921, and each defines a first contacting portion 951 being exposed to the upper receiving room 94, a first rear end portion 953 and a first retaining portion 952 connecting with the first contacting portion 951 and the first rear end portion 952. The second electrical contacts 96 are received in second passageways 929 formed on a lower side of the front portion 923, and each defines a second contacting portion 963 being exposed to the lower receiving room, a second rear end portion 965 and a second retaining portion 964 connecting with the second contacting portion 963 and the second rear end portion 965. Both the first contacting portions 951 and the second contacting portions 963 are substantially flat and non-elastic. The first contacting portions 951 and the second contacting portions 963 are positioned on opposite sides of the front portion 923.

The base portion 91 defines four through holes 911 extending therethrough, four lenses 97 are positioned in the through holes 911 respectively, and protrude forward beyond the front engaging face 910. The lenses 97 are located behind the first contacting portions 951 and the second contacting portions 963, and exposed to the upper receiving room 94. Four optical fibers 98 are received in the through holes 911 to mate with the corresponding lenses 97 to transmit light focused by the lenses 97. The optical fibers 98 extend rearward of the lenses 97. Rear ends of optical fibers 98 extend outside the base portion 91 to be connected to optical cables. Lenses 97 and fibers 98 constitute optical components of the second plug 9. The lenses 97 may alternatively located behind, or coplanar with the front engaging face 910.

The rear portion 924 defines a front abutting face 925, both the front mating face 920 and the front abutting face 925 are used to abut against the electrical connector 100, a pair of vertical ribs 926 extends downwardly from a lower side of the front portion 923 and connecting with the rear portion 924, the rib 926 are spaced from each other to be retained in slots 16, thereby controlling angular movement of the second plug 9 in the electrical connector 100. The vertical ribs 926 are molded as part of the tongue portion 92 to add rigidity and support to the tongue portion 92. In an alternative embodiment, the ribs 926 could alternatively extend upward from the metal shell 93 to be part of the metal shell 93 instead of the plastic housing 90. A keying notch 927 is formed between the ribs 926 and the rear portion 924 to receive a vertical tab 133. The lower wall of the metal shell 93 is provided with a recess 934 corresponding to the keying notch 927. If optical components are not built into the second plug 9, the front engaging face 910 remains available for future capacity additions, a set of copper contacts may be mounted on the front engaging face 910.

The electrical connector 100 includes an insulative housing 1, a plurality of receptacle contacts 2 held in the insulative housing 1, a metal shell 3 enclosing the insulative housing 1. The receptacle contacts 2 comprise a plurality of first receptacle contacts 21 and a plurality of second receptacle contacts 22. The electrical connector 100 defines a mounting face 102 to be mounted onto the PCB.

The insulative housing 1 having a receiving room 10 to accommodate a mating plug 8, 9, a base portion 11, a first tongue portion 12 extending forwardly from the base portion 11 in a cantilevered manner. The first tongue portion 12 is thinner than the base portion 11 and defines a front mating face 120, an upper side face 121 and a lower side face 122 opposite to the upper side face 121. A plurality of first passageways 123 are recessed upwardly from the lower side face 122.

The first receptacle contacts 21 are received in the first passageways 123 respectively, the first receptacle contacts 21 each defining a first contacting portion 210 extending into the receiving room 10, a first soldering portion 212 to be mounted onto the PCB and a first retaining portion 211 connecting with the first contacting portion 210 and the first soldering portion 212.

The insulative housing 1 defines a second tongue portion 13 extending forwardly from the base portion 11 in a cantilevered manner to be parallel with the first tongue portion 12 along a height direction of the insulative housing 1, the second tongue portion 13 is shorter than the first tongue portion 12. A plurality of second passageways 131 are formed on the second tongue portion 13. The second tongue portion 13 defines a first stop surface 132 on a front end thereof to stop an existing USB 2.0 Standard-A plug 8. The base portion 11 defines a second stop surface 111 on a front end thereof to stop a second plug 9 different from the existing USB 2.0 Standard-A plug 8. Both the first tongue portion 12 and the second tongue portion 13 extend forwardly from the second stop surface 111.

The second receptacle contacts 22 are received in the corresponding second passageways 131, and each defining a second contacting portion 220, a second soldering portion 222 and a second retaining portion 221 connecting with the second contacting portion 220 and the second soldering portion 222. The first contacting portions 210 are arranged in a first row, the second contacting portions 220 are arranged in a second row located below and behind the first row. Both the first contacting portions 210 and the second contacting portions 220 are elastic and deflectable along a height direction of the housing 1. A receiving opening 112 are recessed on a rear portion of the base portion 11 to receive first soldering portions 212 and second soldering portions 222.

Figure 2:
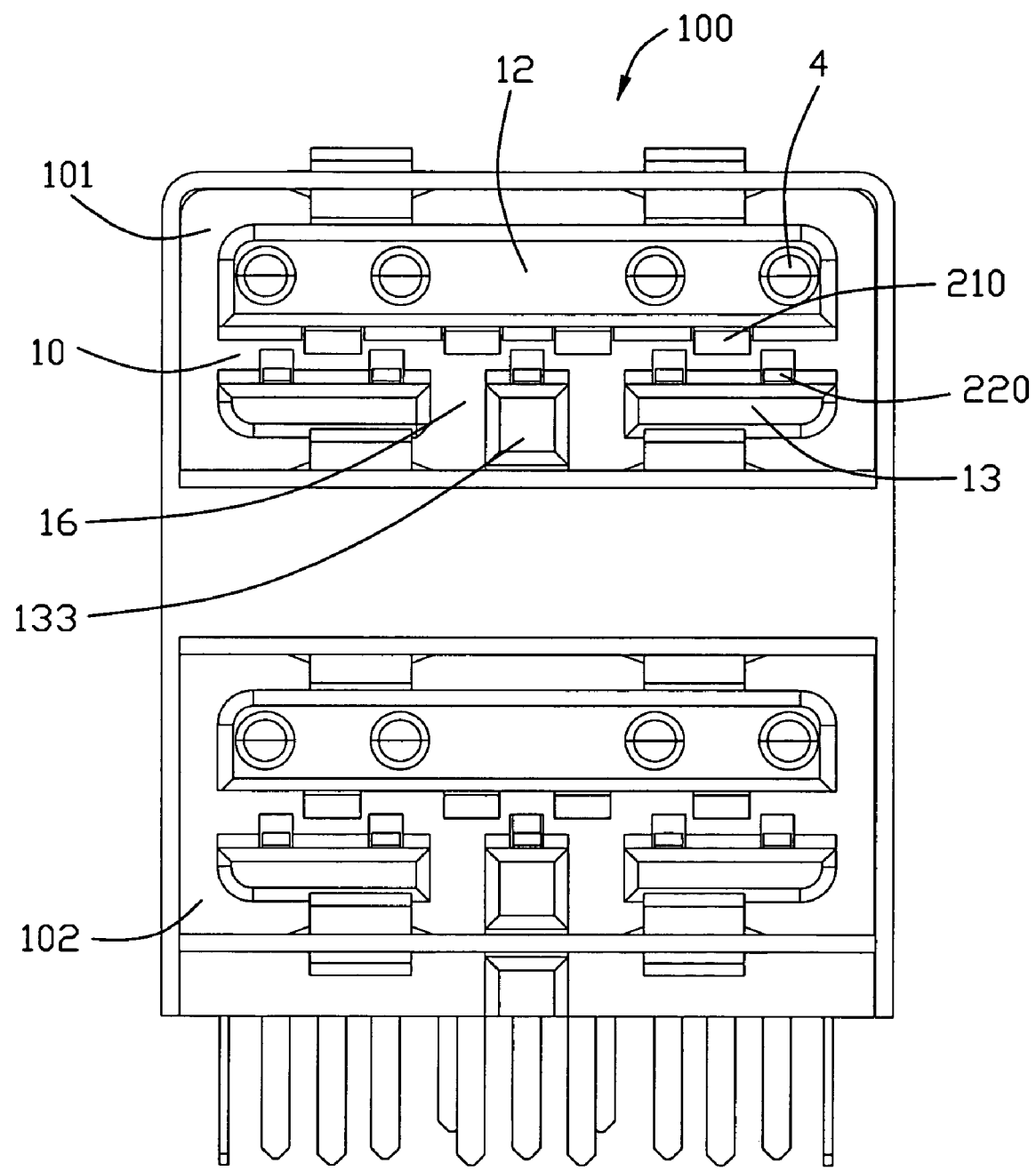
FIG. 2 is a front view of the electrical connector shown in FIG. 1.
Figure 3:
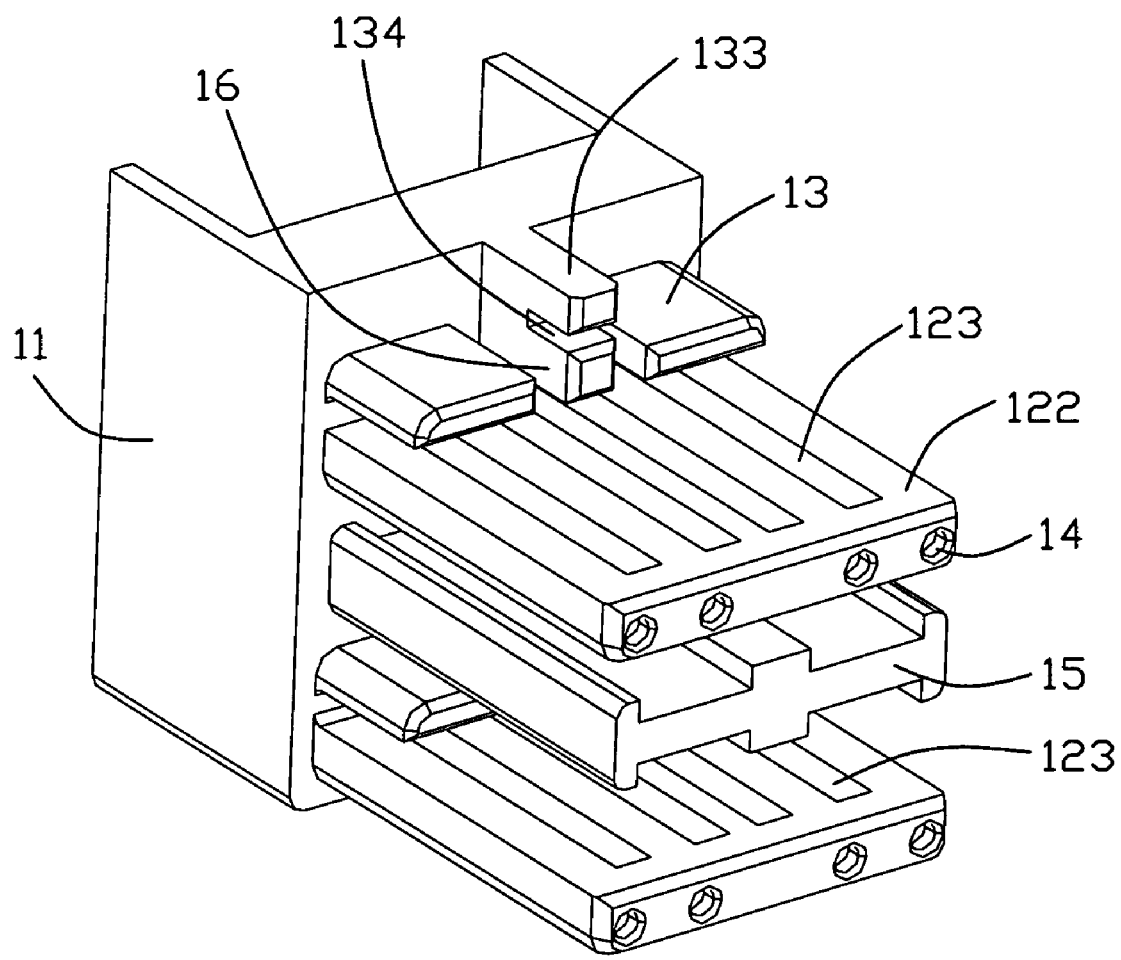
FIG. 3 is a perspective view of an insultaive housing of the electrical connector shown in FIG. 1.
Figure 4:
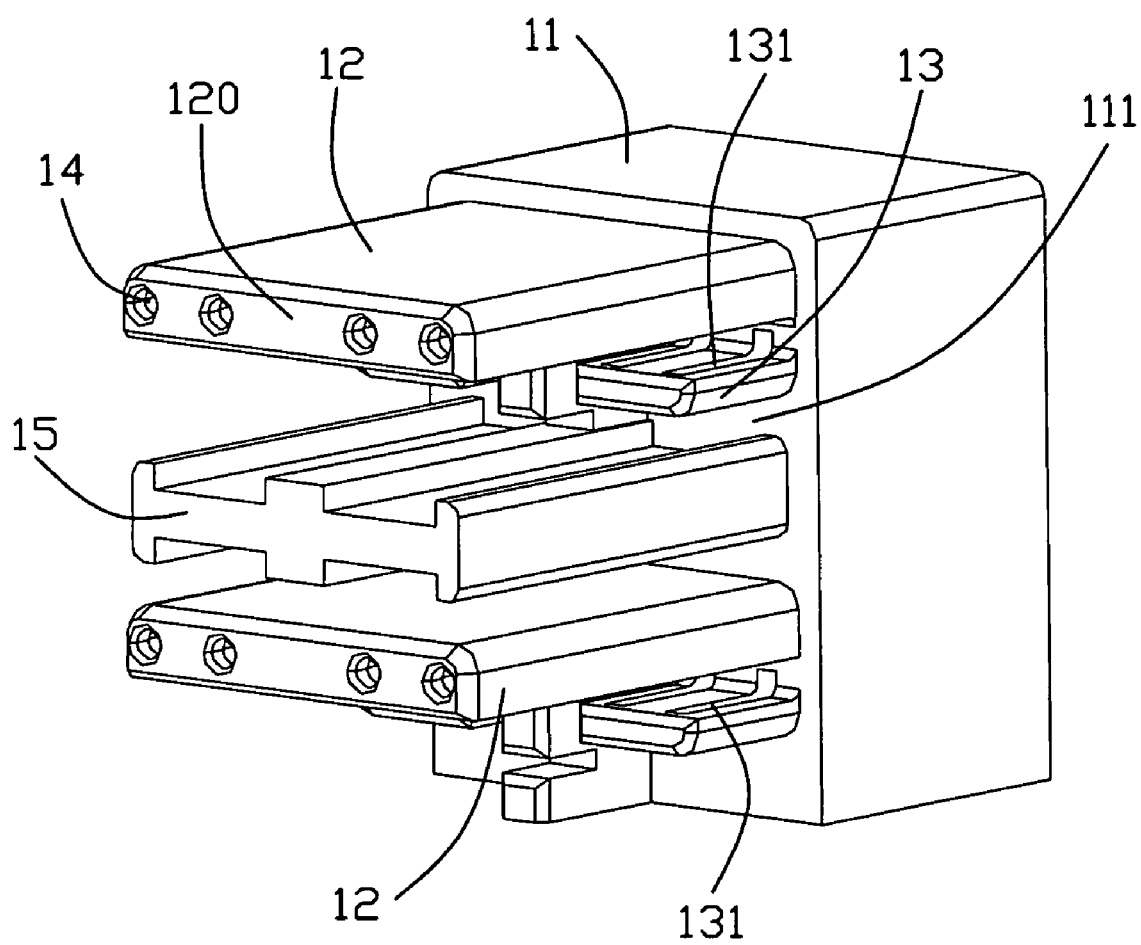
FIG. 4 is a view similar to FIG. 3, while taken from a different aspect.
Figure 5:
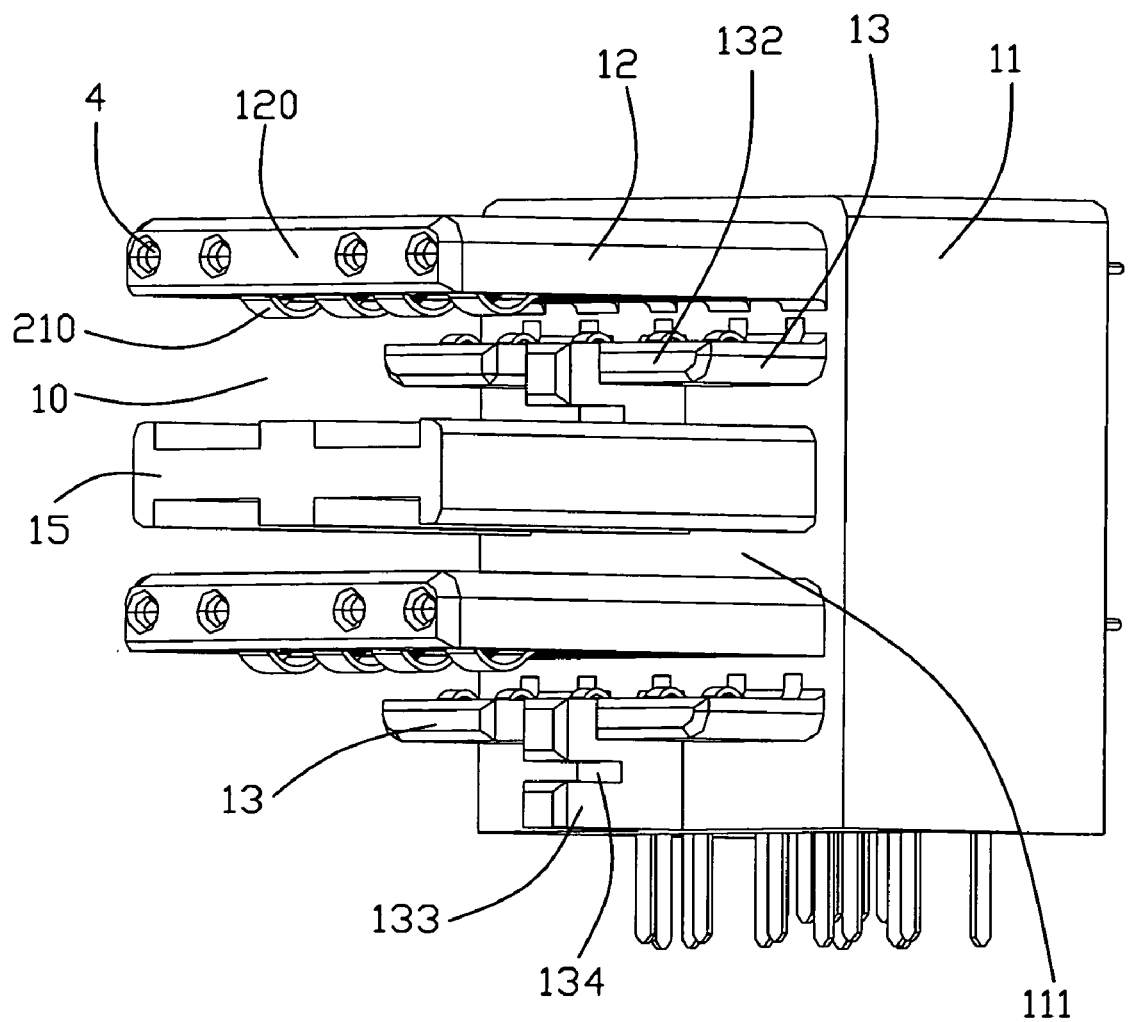
FIG. 5 is a perspective view of the electrical connector shown in FIG. 1 with a metal shell removed.
Figure 6:
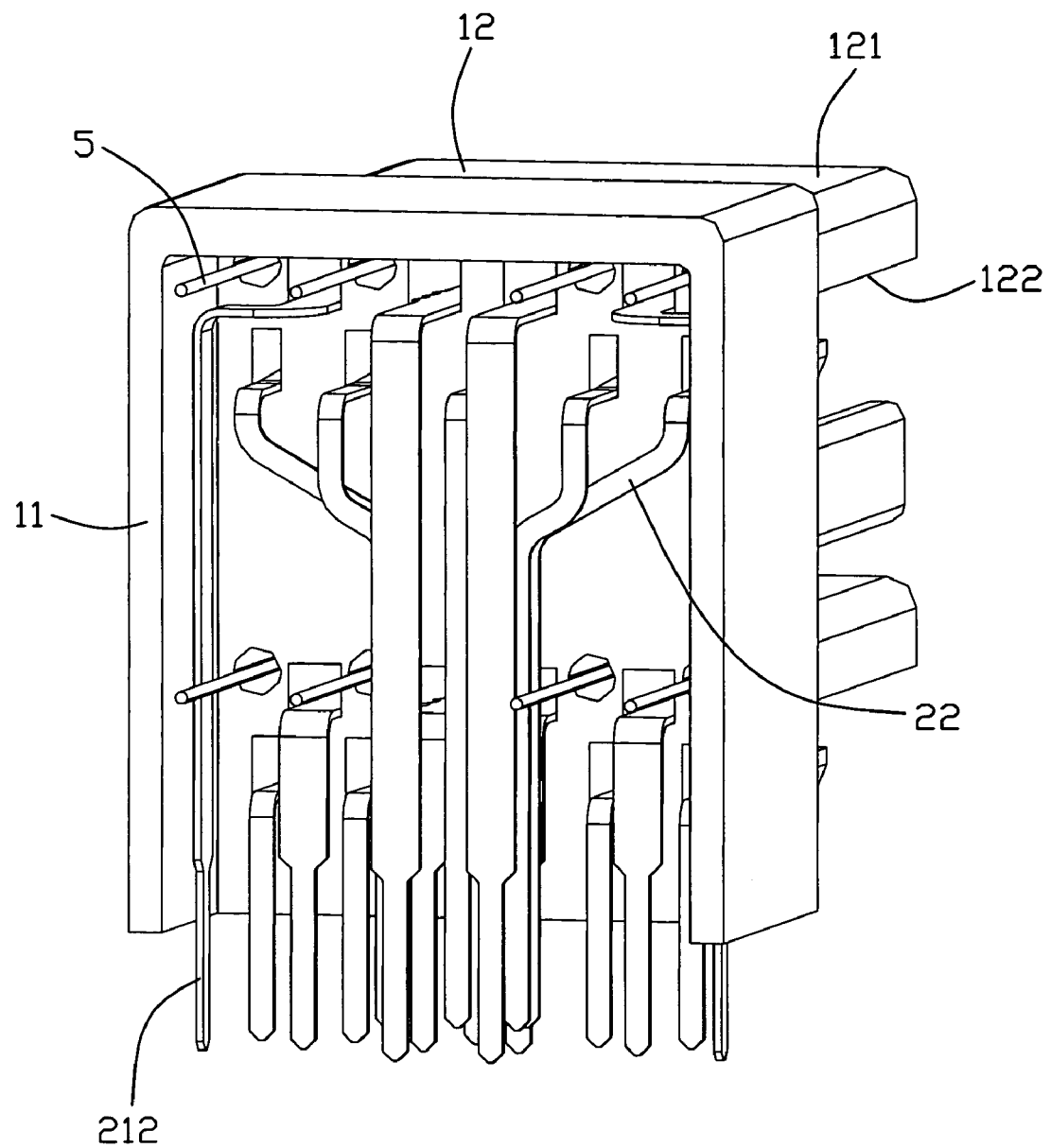
FIG. 6 is a view similar to FIG. 5, while taken from a different aspect.
Figure 7:
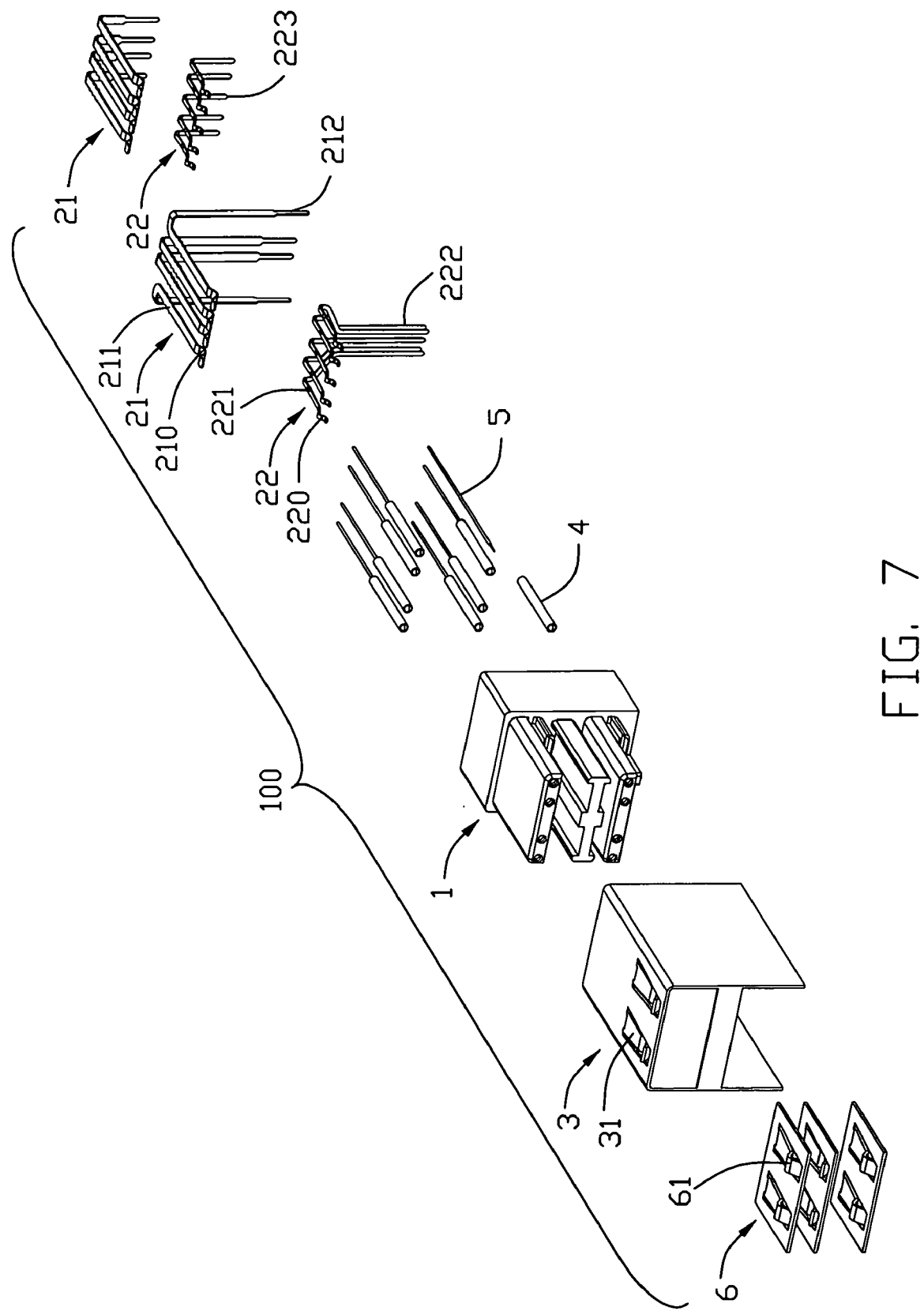
FIG. 7 is an exploded view of the electrical connector shown in FIG. 1.
Figure 8:
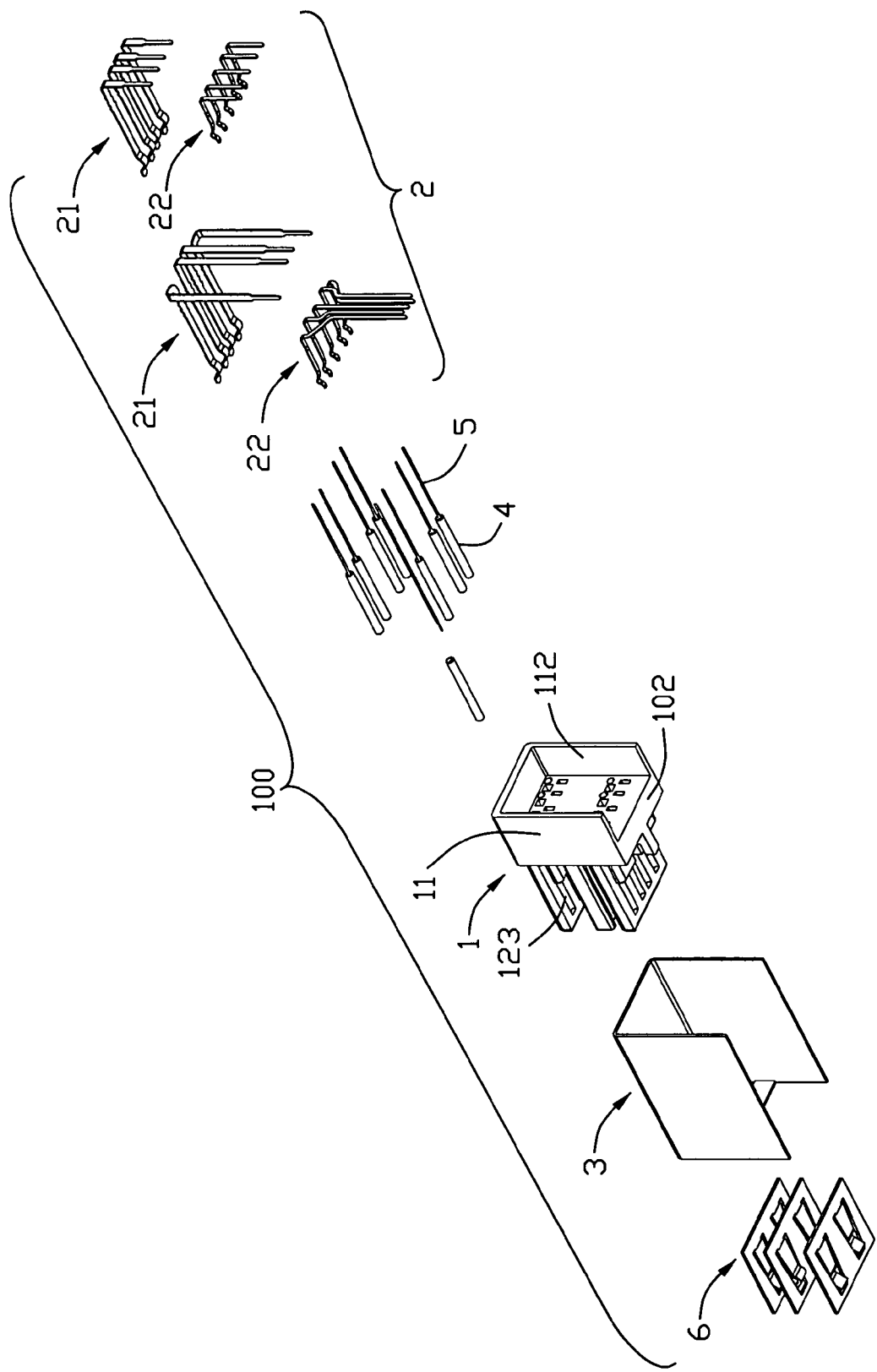
FIG. 8 is a view similar to FIG. 7, while taken from a different aspect.
Figure 9:
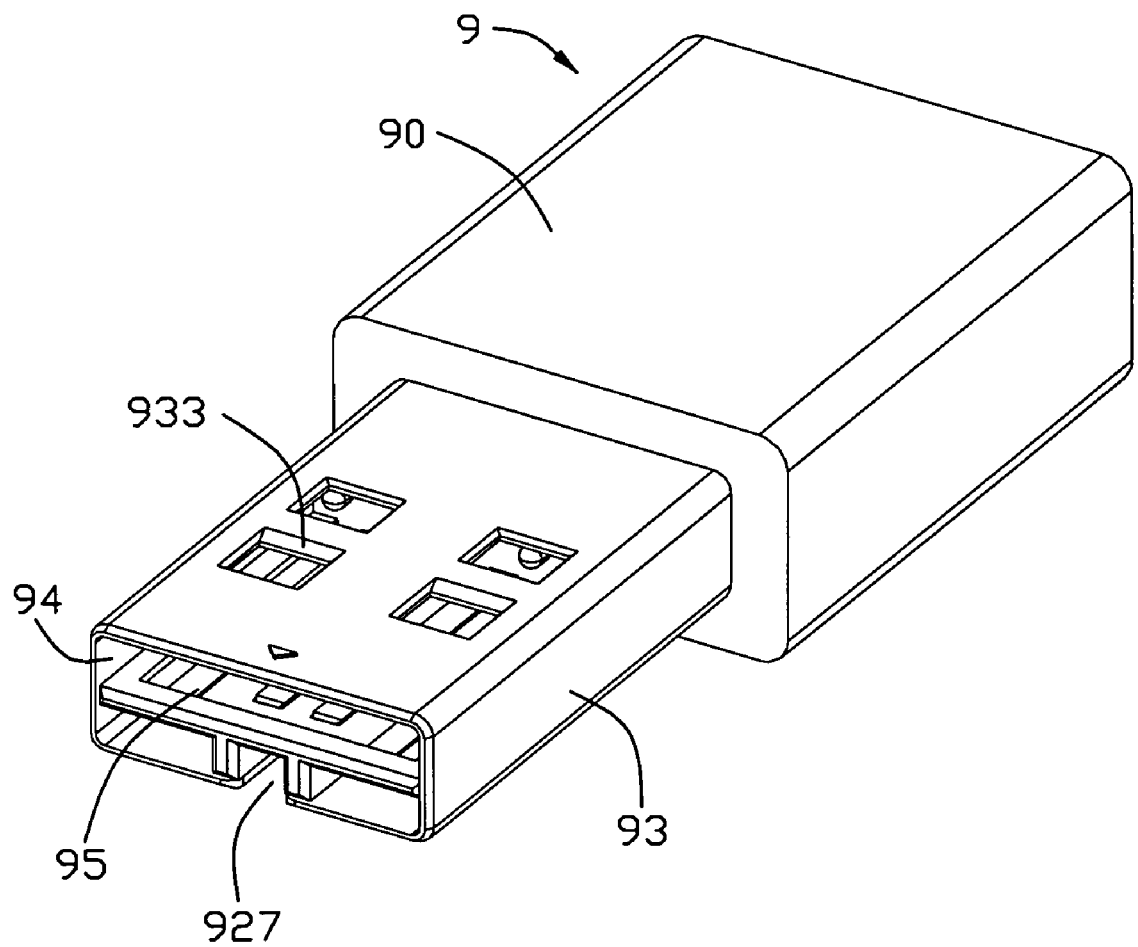
FIG. 9 is a perspective view a second plug according to the first embodiment of the present invention.
Figure 10:
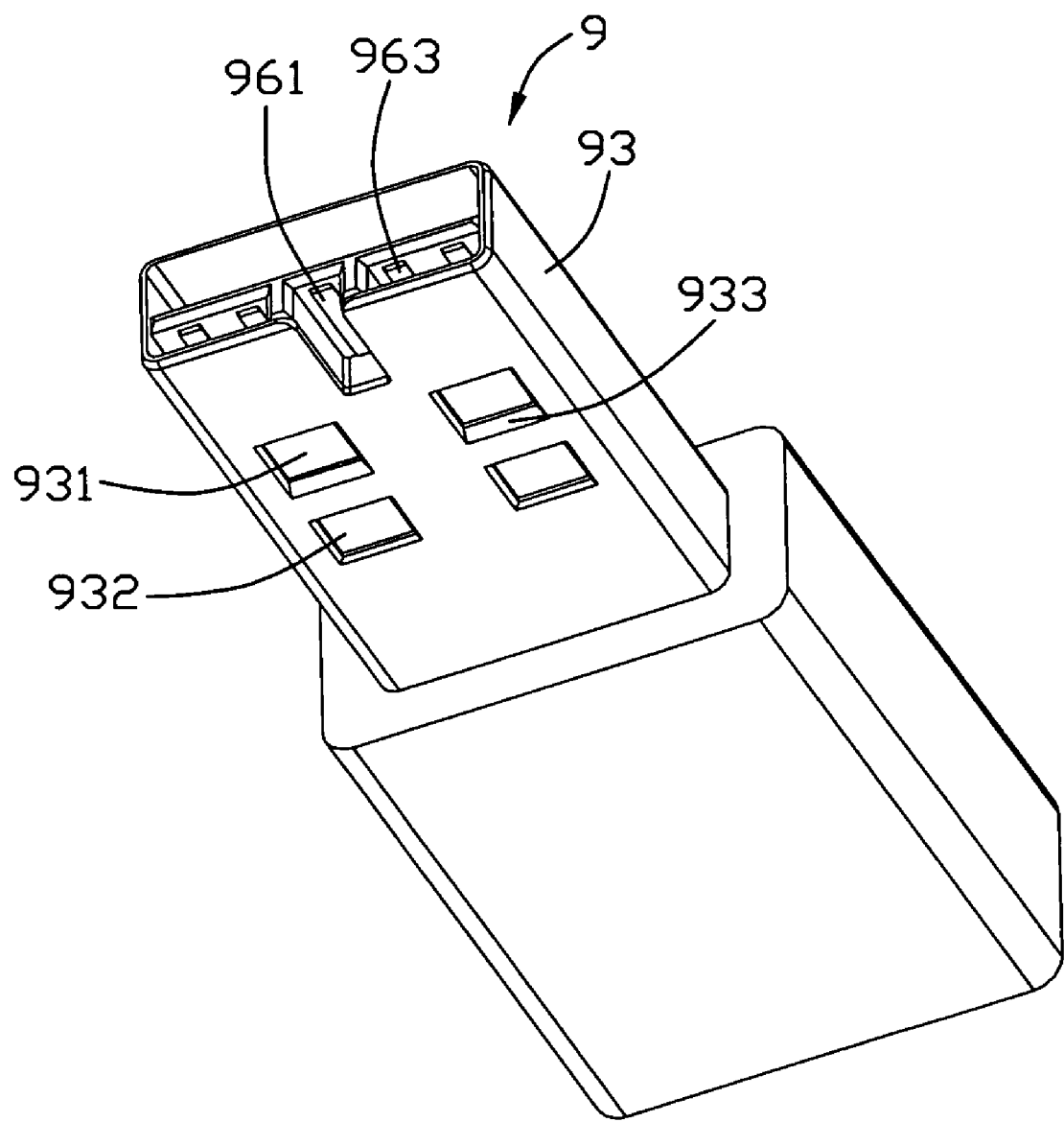
FIG. 10 is a view similar to FIG. 9, while taken from a different aspect.
Figure 11:
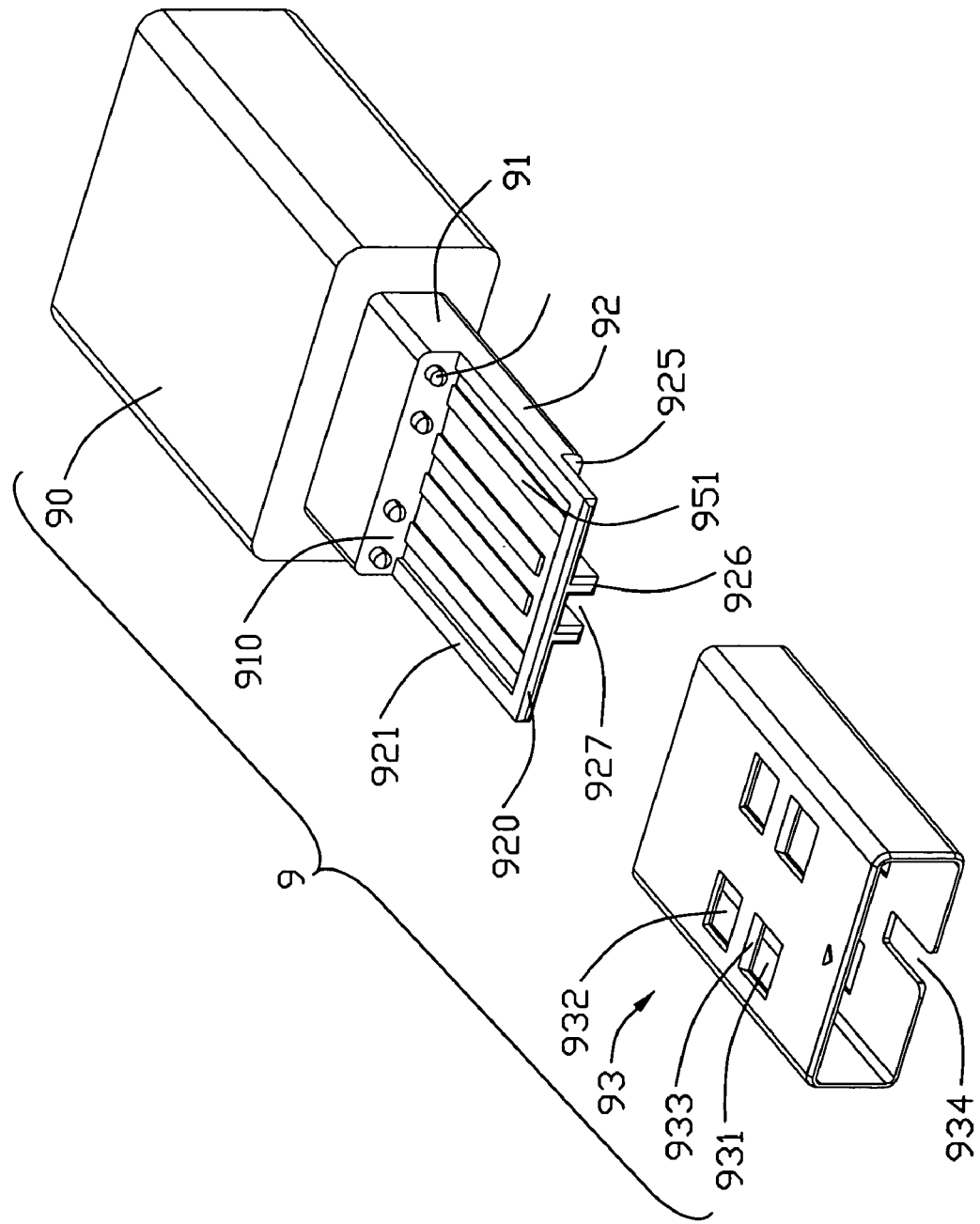
FIG. 11 is a partly exploded perspective view of the second plug shown in FIG. 9.
Figure 12:
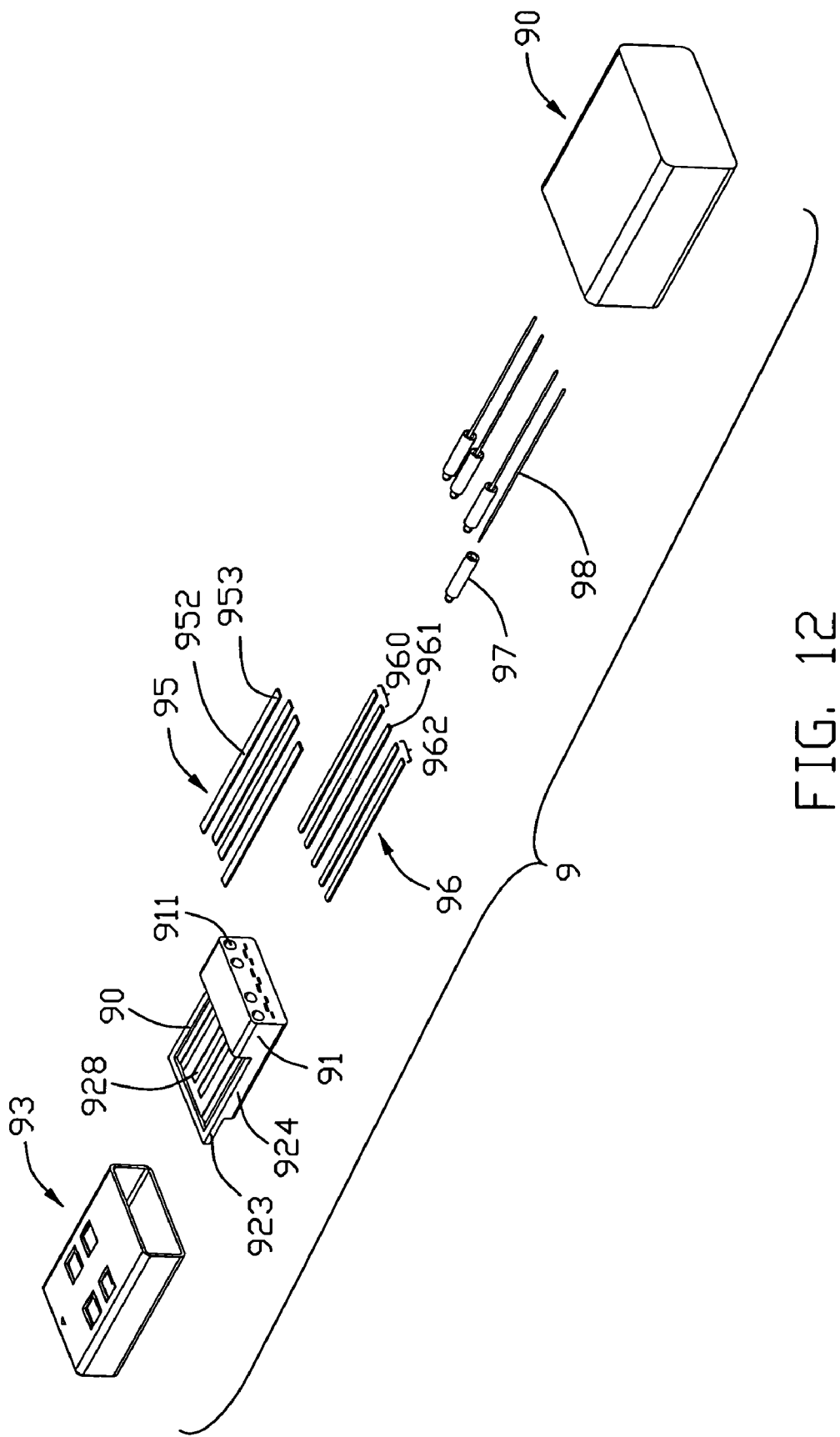
FIG. 12 is an exploded view of the second plug shown in FIG. 9.
Figure 13:
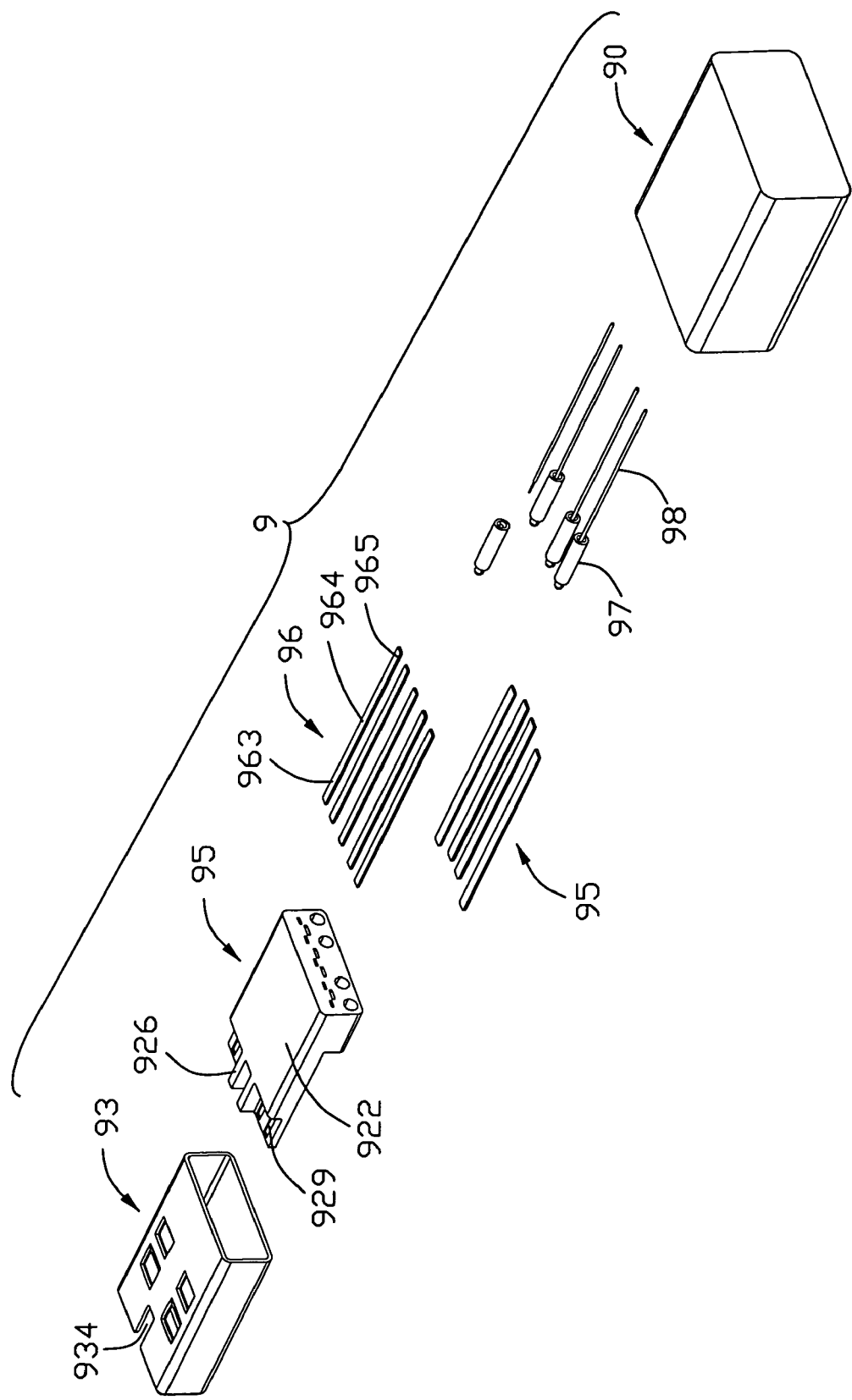
FIG. 13 is a view similar to FIG. 12, while taken from a different aspect.

Referring to FIGS. 1-2, the first contacts 21 are used to transmit existing USB 2.0 signal, the first contacts include a power contact, a D− signal contact, a D+ contact and a ground contact which are arranged orderly from left to right along a lateral direction of the first tongue portion 12. The second contacts 22 include a first pair of differential contacts, a second pair of differential contacts and a ground contact 223 located between the first pair of differential contacts and the second pair of differential contacts along a lateral direction of the second tongue portion 13. The contacts 22 may be alternatively configured in non-differential manner.

A plurality of through holes 14 are recessed rearward from the front mating face 120 to extend through the first tongue portion 12 and the base portion 11. A plurality of lenses 4 are positioned on the first tongue portion 12 and forward of the first contacting portions 210, the lenses 4 are exposed to exterior through the front mating face 120, thereby making it easy to clean the lenses 4 without a risk of damaging deflectable receptacle contacts 21, 22.

A plurality of optical fibers 5 is received in the through holes 14 to optically mate with the lenses 4 respectively. The optical fibers 5 extend rearward of the lenses 4, and extend rearward and outside the base portion 11 to be connected to electro-optical converters (not shown) on the PCB. The optical fibers 5 and the lenses 4 constitute optional fiber-optic components which can be equally applied to a single-stack receptacle.

A separating block 15 extends forwardly from second stop surface 111 to divide the electrical connector 100 into the upper interface 101 and the lower interface 102, the second tongue portion 13 in the upper interface 101 is parallel with and spaced from the separating block 15 along a height direction of the housing 1. The first tongue portion 12 in the lower interface 102 is adjacent to and parallel with the separating block 15 along the height direction of the housing 1.

A vertical tab 133 protrudes downwardly from a middle portion of the second tongue portion 13, a lateral slit 134 is formed on the vertical tab 133. The slots 16 are formed on the second tongue portion 13 and located opposite sides of the vertical tab 133. An inner metal plate 6 is inserted into the lateral slit 134 and retained by the vertical tab 133. A plurality of spring tabs 31, 61 are provided on the shell 3 and the inner metal plate 6 respectively, the spring tabs 31, 61 extend into the receiving room 10 to bias against the mating plug 8, 9. In process of insertion of the second plug 9 into the receiving room 10, the spring tabs 31, 61 pass by chamfers 933 on rear sides of the first set of windows 931 and then stop in the second set of windows 932. The spring tabs 31, 61 lock with the second set of windows 932.

Figure 14:
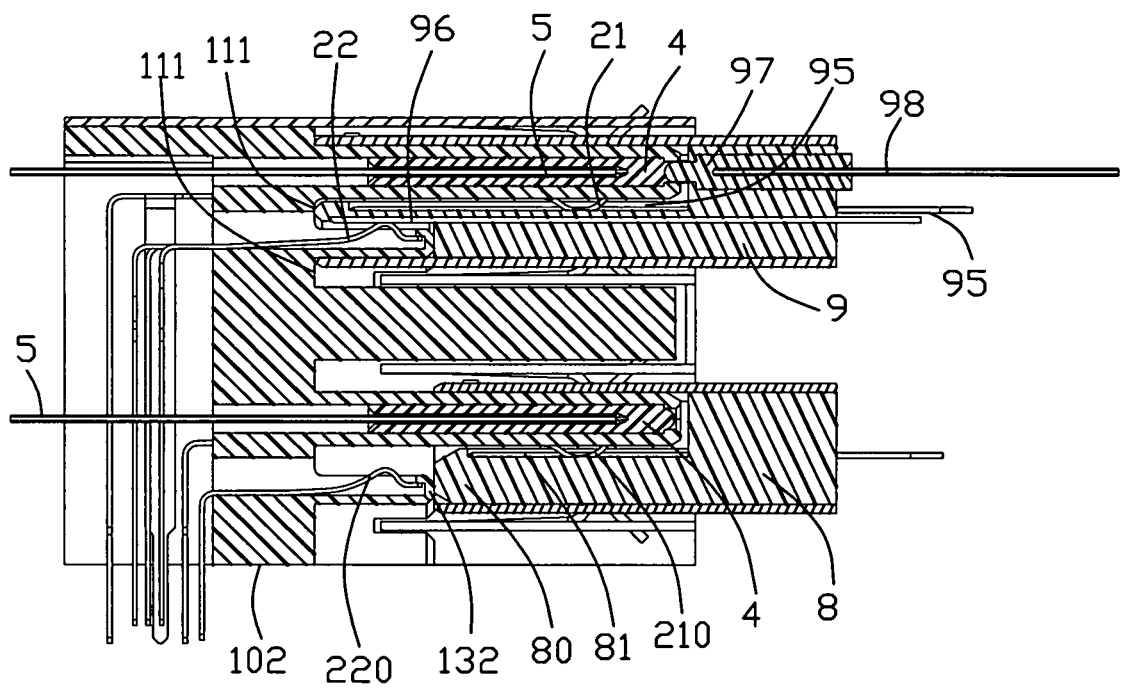
FIG. 14 is a cross-sectional view of the electrical connector shown in FIG. 2 with the second plug and an existing USB 2.0 standard type-A plug fully inserted therein.
Figure 15:
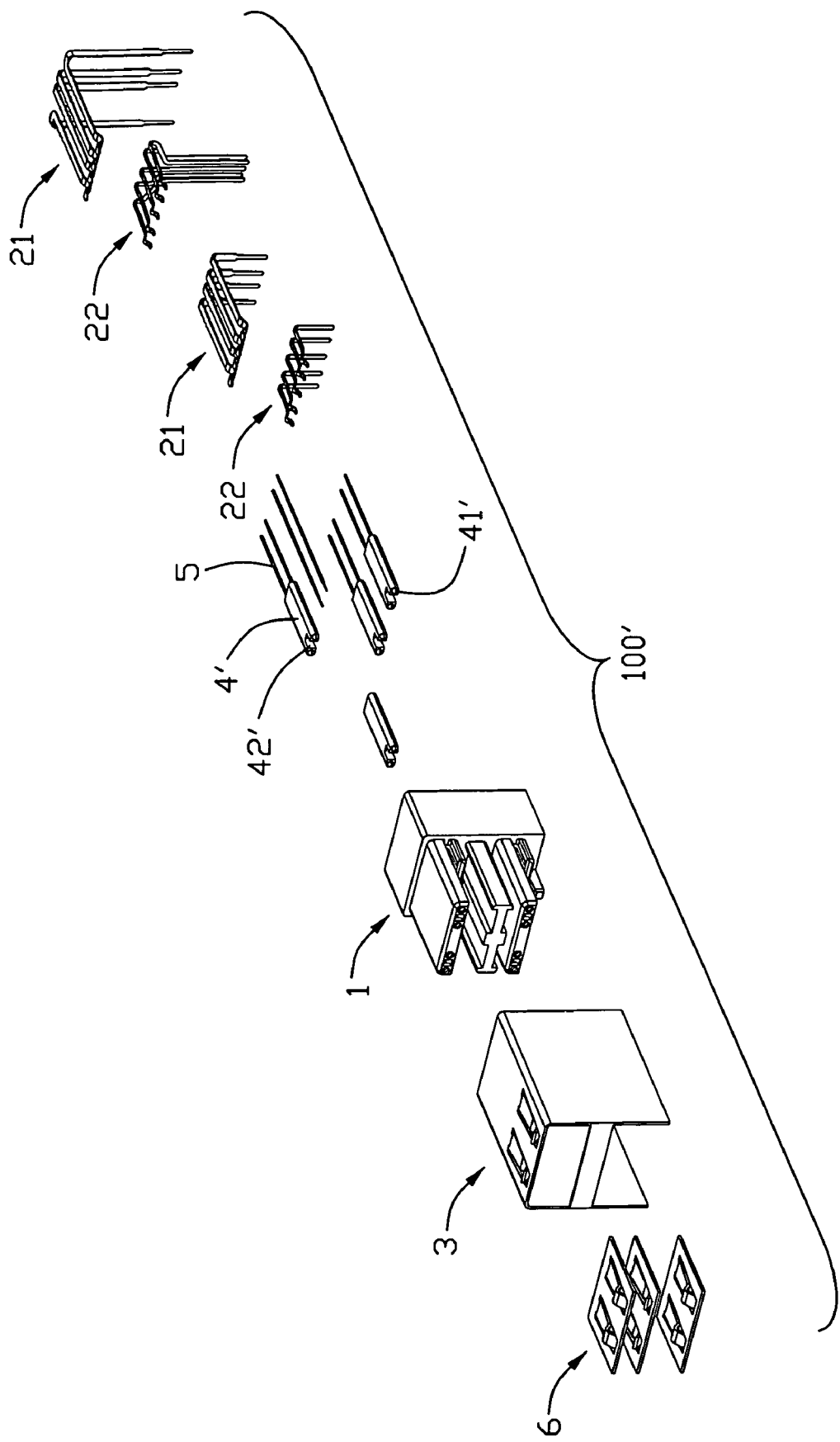
FIG. 15 is an exploded view of the electrical connector according to a second embodiment of the present invention.
Figure 16:
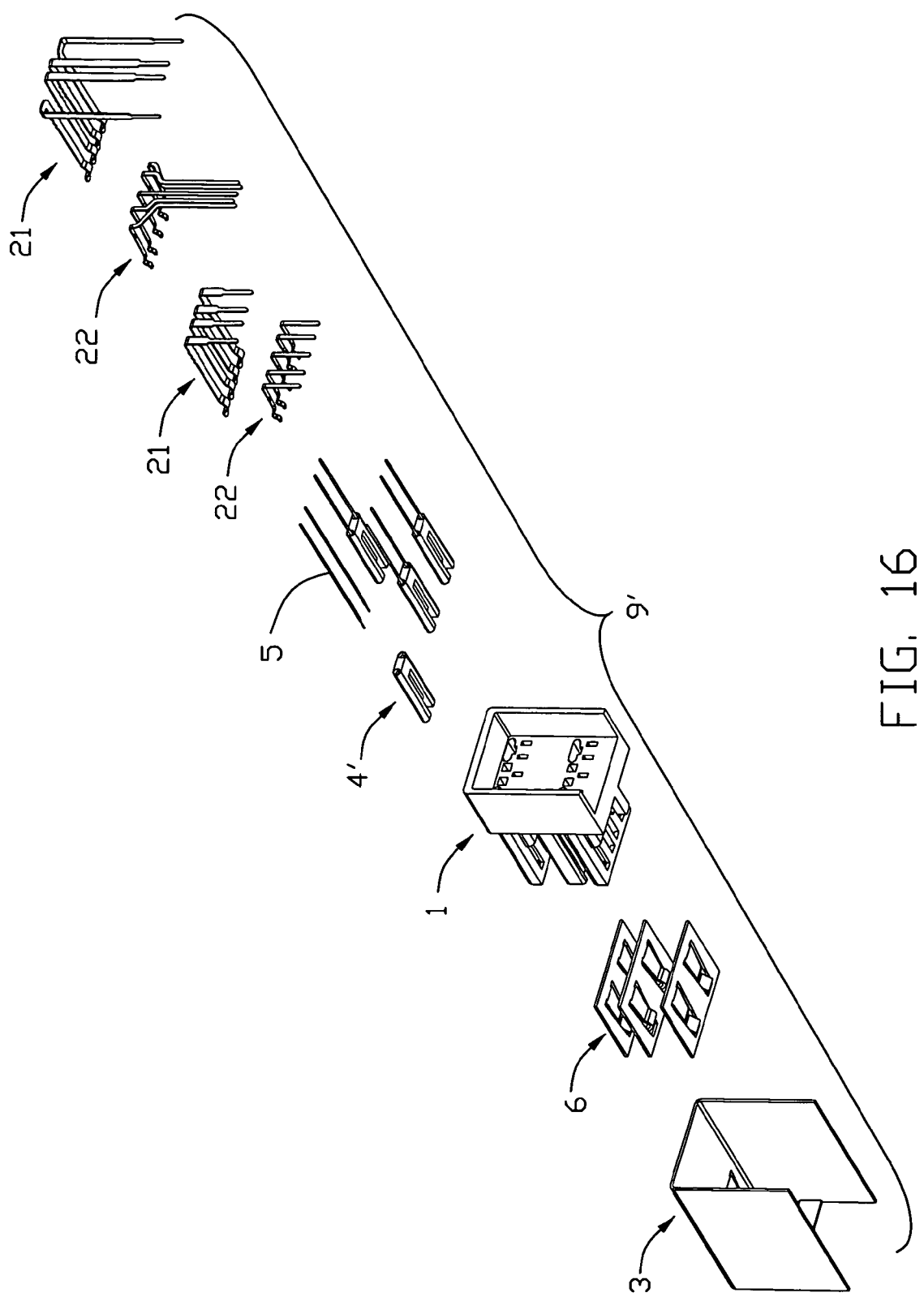
FIG. 16 is a view similar to FIG. 15, while taken from a different aspect.
Figure 17:
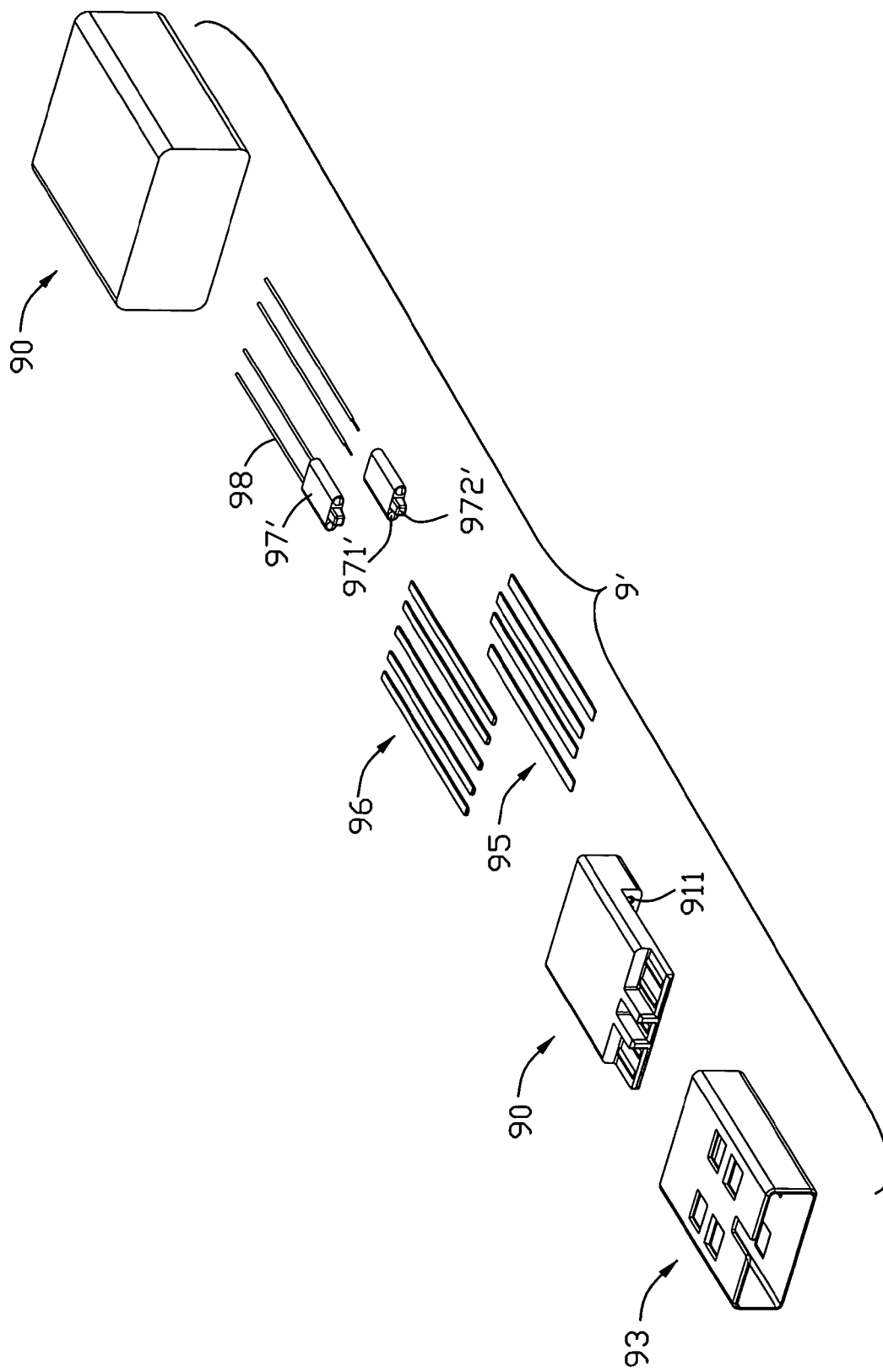
FIG. 17 is an exploded view of the second plug according to the second embodiment of the present invention.
Figure 18:
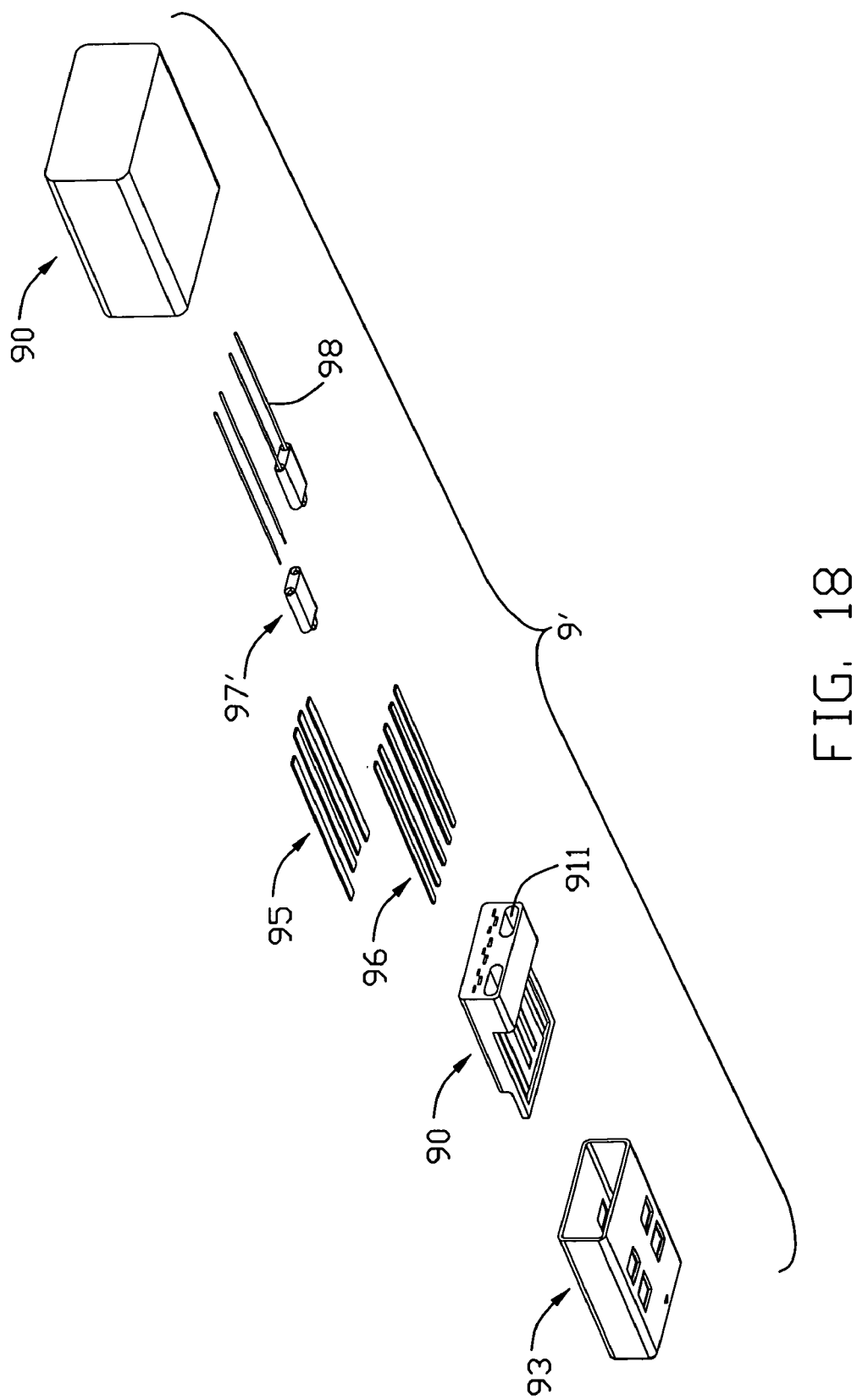
FIG. 18 is a view similar to FIG. 17, while taken from a different aspect.
Figure 19:
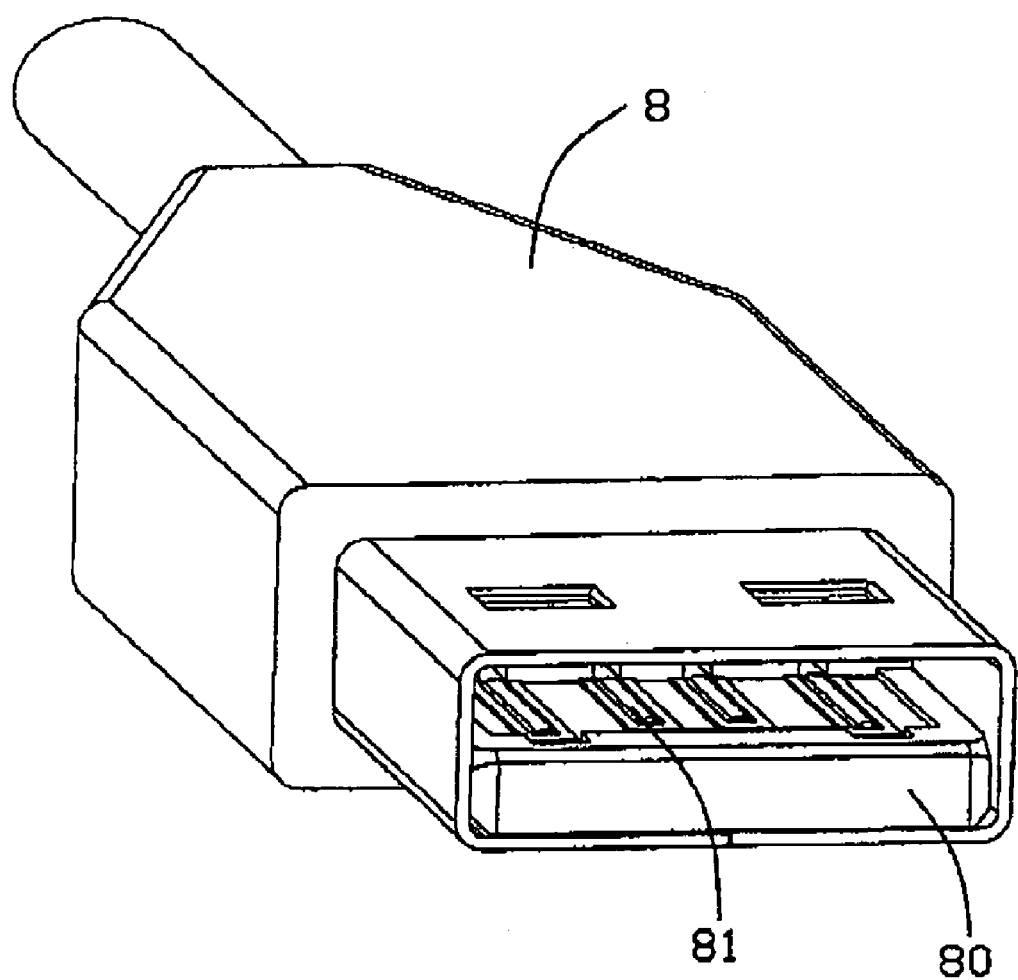
FIG. 19 is a perspective view of an existing USB 2.0 standard type-A plug.

Referring to FIG. 14, in fully mated state, the tongue portion 80 of the first plug 8 is stopped by the first stop surface 132 of the second tongue portion 13 of the electrical connector 100, only the first contacting portions 210 of the electrical connector 100 establish electrical connection with the first contacts 81 of the first plug 8. The second contacting portions 220 and the lenses 4 do not mate with the first plug 8 either electrically or optically.

The second plug 9 is stopped by either engagement between the first stop face 132 and the front abutting face 925 of the rear portion 924 or engagement between the second stop surface 111 and the front mating face 920 of the front portion 923. The front end of the lenses 97 of the second plug 9 are inserted into the through holes 14 to align with the lenses 4 of the electrical connector 100, thereby establishing optical engagement therebetween. The first contacts 95 of the second plug 9 contact with the first contacts 21 of the electrical connector 100 respectively, the second contacts 96 of the second plug 9 contact with the second contacts 22 of the electrical connector 100 respectively. It is noted that the fiber-based signal conductors 4, 5, 97, 98 may be replaced with copper-based signal conductors. Optical components 4, 5, 97, 98 are added to incorporate additional signal-transmitting capacity. Backwards-compatibility is provided for the electrical connector 100 to mate with the existing USB 2.0 Standard-A plug 8.

Referring to FIGS. 15-18, an electrical connector 100' according to a second embodiment is similar to the first embodiment, and differs in that one lens 4' connects with a pair of optical fibers 5, the lens 4' defines a pair of mating end 41' to focus light, a cutout 42' is formed between the pair of mating end 41'. one lens 97' of the second plug 9' connect with a pair of optical fibers 98, the lens 97' defines a pair of mating ends 971' for mating with mating end 41' of the lens 4' and a protrusion 972' therebetween. In full mating state of the electrical connector 100' and the second plug 9', the protrusion 972' is retained in the cutout 42', the mating ends 971', 41' optically engage with each other.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

What is claimed is:

1. A receptacle connector to be mounted on a printed circuit board, comprising:

an insulative housing having a base portion, a first tongue portion extending forwardly from the base portion and a plurality of first passageways, the first tongue portion being thinner than the base portion and defining a front mating face, an upper side face and a lower side face opposite to the upper side face; the insulative housing further defining a second tongue portion extending forwardly from the base portion to be spaced from the first tongue portion along a height direction of the insulative housing, the second tongue portion is shorter than the first tongue portion, a plurality of second passageways are formed on the second tongue portion;

a metal shell enclosing the first tongue portion and the second tongue portion to form a receiving room to receive either an existing USB 2.0 standard type-A plug or a second plug non-simultaneously; the second tongue portion defines a first stop surface on a front end thereof to stop the existing USB 2.0 Standard-A plug, the base portion defines a second stop surface on a front end thereof to stop the second plug different from the existing USB 2.0 Standard-A plug;

a plurality of first electrical contacts received in the first passageways respectively, the first electrical contacts each defining a first contacting portion, a first soldering portion and a first retaining portion connecting with the first contacting portion and the first soldering portion;

a plurality of second contacts received in the second passageways respectively and each defining a second contacting portion, a second soldering portion and a second retaining portion connecting with the second contacting portion and the second retaining portion;

a plurality of optical components mounted on the first tongue portion and being exposed to exterior through the front mating face, the optical components extending forwardly along the first tongue portion to be adjacent to the front mating face; and wherein the first contacting portions are arranged in a first row and the second contacting portions are arranged in a second row located below and behind the first row.

2. The receptacle connector as claimed in claim 1, wherein the first electrical contacts each defines a front tip end, the optical components include a plurality of lenses positioned on the first tongue portion and being forward of front tip ends of the first electrical contacts, and a plurality of optical fibers mating with the lenses respectively and extending rearward of the lenses.

3. The receptacle connector as claimed in claim 2, wherein the insulative housing defines a plurality of through holes extending through the first tongue portion and the base portion, the lenses are retained in the through holes respectively, the optical fibers are aligned with the lenses respectively along a front-to-rear direction.

4. The receptacle connector as claimed in claim 1, wherein both the first contacting portions and the second contacting portions are elastic and deflectable along a height direction of the housing.

5. A plug connector comprising:

an insulative housing having a base portion defining a front engaging face, a tongue portion extending forwardly from the front engaging face, the tongue portion being thinner than the base portion and defining a front mating face, an upper side face and a lower side face opposite to the upper side face;

a pair of vertical ribs extending downwardly from a lower side of the tongue portion, the ribs being spaced from each other to form a keying notch therebetween;

a metal shell mounted on the insulative housing and defining an upper wall, a pair of side walls and a lower wall, an upper receiving room being formed between the upper wall and the upper side face;

a plurality of first electrical contacts each defining a first contacting portion being exposed to the upper receiving room, a first rear end portion and a first retaining portion connecting with the first contacting portion and the first rear end portion;

a plurality of second electrical contacts positioned on the lower side of the tongue portion, the second contacts including a first pair of differential contacts, a second pair of differential contacts and a ground contact located between the first pair of differential and the second pair of differential contacts along a lateral direction of the tongue portion, the ground contact is disposed within the keying notch and isolated from the first and the second pair of differential contacts by the vertical ribs; the lower wall of the metal shell abuts against bottom sides of the vertical ribs to form a lower receiving room between the lower wall and the tongue portion;

a plurality of lenses positioned on the base portion and on a rear side of the first contacting portions, the lenses being exposed to the upper receiving room and extending forwardly beyond the front engaging face while not beyond the front mating face;

a plurality of optical fibers mating with the lenses respectively and extending outside the base portion.

6. The plug connector as claimed in claim 5, each of the second contacts defines a second contacting portion, a second rear end portion and a second retaining portion connecting with the second contacting portion and the second rear end portion; wherein the first contacts are used to transmit existing USB 2.0 signal and include a power contact, a D− signal contact, a D+ contact and a ground contact which are arranged orderly along the lateral direction of the tongue portion, both the first contacting portions and the second contacting portions being substantially flat and non-elastic.

7. The plug connector as claimed in claim 6, wherein the tongue portion includes a front portion and a rear portion connecting with the base portion and the front portion, the front portion is thinner than the rear portion, the first contacting portions and the second contacting portions are positioned on opposite sides of the front portion.

8. The plug connector as claimed in claim 7, wherein the rear portion defines a front abutting face on a front end thereof, both the front mating face and the front abutting face are used to abut against a mating connector, the vertical ribs extend downwardly from a lower side of the front portion and connect with the rear portion.

9. The plug connector as claimed in claim 6, wherein the lenses are positioned behind the first contacting portions and the second contacting portions.

10. The receptacle connector as claimed in claim 1, wherein the second tongue portion includes a vertical tab protruding downwardly from a middle portion thereof, a lateral slit is formed on the vertical tab, the metal shell includes an inner metal plate being inserted into the lateral slit and retained by the vertical tab.

11. The receptacle connector as claimed in claim 10, wherein the second tongue portion is provided with a pair of slots on opposite sides of the vertical tab.

12. The plug connector as claimed in claim 5, wherein the lower wall of the metal shell defines a recess corresponding to the keying notch.

* * * * *